US007633648B2

(12) United States Patent
Sasanuma et al.

(10) Patent No.: US 7,633,648 B2
(45) Date of Patent: Dec. 15, 2009

(54) METHOD AND APPARATUS FOR CALCULATING DISTANCES AND REFLECTION DIFFERENCES BETWEEN MEASUREMENT POINTS ON PRINTED MATTER TO EVALUATE IMAGE QUALITY

(75) Inventors: Nobuatsu Sasanuma, Abiko (JP); Tomohisa Itagaki, Abiko (JP); Masami Tomita, Matsudo (JP); Toshio Saishoji, Fuchu (JP); Satoshi Takayama, Chofu (JP); Miyoko Hayashi, Fuchu (JP)

(73) Assignee: Canon Kabushiki Kaisha (JP)

( * ) Notice: Subject to any disclaimer, the term of this patent is extended or adjusted under 35 U.S.C. 154(b) by 592 days.

(21) Appl. No.: 11/614,296

(22) Filed: Dec. 21, 2006

(65) Prior Publication Data
US 2007/0153309 A1 Jul. 5, 2007

(30) Foreign Application Priority Data
Dec. 27, 2005 (JP) ............................. 2005-376672

(51) Int. Cl.
*H04N 1/40* (2006.01)
*G01N 21/17* (2006.01)
*G01J 3/00* (2006.01)
*H04N 1/50* (2006.01)
*G01N 21/25* (2006.01)
*G01J 3/52* (2006.01)

(52) U.S. Cl. .................. 358/1.9; 358/3.24; 358/504; 358/406; 382/112; 356/402; 356/421

(58) Field of Classification Search .................. 358/1.9, 358/3.24, 501, 504, 527, 406; 382/112; 356/402, 356/406, 421
See application file for complete search history.

(56) References Cited

U.S. PATENT DOCUMENTS 4,685,139 A * 8/1987 Masuda et al. .............. 382/112

(Continued)

FOREIGN PATENT DOCUMENTS

JP 62-296669 A 12/1987

(Continued)

OTHER PUBLICATIONS

Official Action cited in corresponding U.S. Appl. No. 11/615,353.

(Continued)

*Primary Examiner*—Scott A Rogers
(74) *Attorney, Agent, or Firm*—Rossi, Kimms & McDowell, LLP

(57) ABSTRACT

Upon observing homogeneity in page image by the human eye, a permissible level associated with color reproduction with respect to an identical color signal changes depending on the distance from an interest point. Since the conventional homogeneity in page image evaluation scheme doesn't take the above characteristics into consideration, the correlation between a finished image and the evaluation result cannot be exploited fully. Hence, image data, which forms an image with identical density within a range to be evaluated in one page, is output to a printer to measure reflection characteristics of the image at points on output of the printer. One point is set as a reference point, and distances between the reference point and the remaining points, and differences of the reflection characteristic between the reference point and the remaining points are calculated. The image quality within the range is evaluated based on the distances and differences.

7 Claims, 8 Drawing Sheets

U.S. PATENT DOCUMENTS

| | | | | |
|---|---|---|---|---|
| 5,182,721 A | * | 1/1993 | Kipphan et al. | 382/112 |
| 5,353,052 A | * | 10/1994 | Suzuki et al. | 347/19 |
| 5,818,960 A | | 10/1998 | Gregory, Jr. et al. | |
| 6,000,776 A | * | 12/1999 | Suzuki et al. | 347/19 |
| 6,172,771 B1 | * | 1/2001 | Ikeda et al. | 358/406 |
| 6,515,769 B1 | * | 2/2003 | Ikeda et al. | 358/3.1 |
| 6,631,210 B1 | * | 10/2003 | Mutoh et al. | 358/1.9 |
| 6,761,426 B2 | * | 7/2004 | Tsuchiya et al. | 347/19 |
| 7,027,157 B2 | * | 4/2006 | Steinfield et al. | 356/425 |
| 7,027,187 B1 | * | 4/2006 | Zuber | 358/1.9 |
| 7,130,076 B2 | * | 10/2006 | Shibuya et al. | 358/1.9 |
| 7,236,712 B2 | * | 6/2007 | Matsuyama | 399/49 |
| 2007/0153309 A1 | | 7/2007 | Sasanuma et al. | |
| 2007/0153340 A1 | * | 7/2007 | Itagaki et al. | 358/504 |
| 2007/0229870 A1 | * | 10/2007 | Doi et al. | 358/1.9 |
| 2009/0086273 A1 | * | 4/2009 | Ming et al. | 358/1.9 |

FOREIGN PATENT DOCUMENTS

| | | |
|---|---|---|
| JP | 63-185279 A | 7/1988 |
| JP | 1-309082 A | 12/1989 |
| JP | 8-219886 A | 8/1996 |
| JP | 2001-144987 A | 5/2001 |
| JP | 2002-344759 A | 11/2002 |
| JP | 2003-216398 A | 7/2003 |

OTHER PUBLICATIONS

Related co-pending U.S. Appl. No. 11/614,353; Nobuatsu Sasanuma et al.; "Color Processing Method and Apparatus Thereof"; filed Dec. 21, 2006; Spec. pp. 1-62; Figs. 1-22.

\* cited by examiner

METHOD AND APPARATUS FOR CALCULATING DISTANCES AND REFLECTION DIFFERENCES BETWEEN MEASUREMENT POINTS ON PRINTED MATTER TO EVALUATE IMAGE QUALITY

BACKGROUND OF THE INVENTION

1. Field of the Invention

The present invention relates to evaluation processing for evaluating the image quality of printed matter of an image forming apparatus.

2. Description of the Related Art

As one item for evaluating the image quality of printed matter, an evaluation scheme of homogeneity in page image associated with color reproductivity has been proposed. The evaluation scheme of homogeneity in page image evaluates color and density heterogeneities in one page image (to be referred to as heterogeneity in page image hereinafter, in other words, color differences in page image) using a small color difference spectrometer and XY stage. Therefore, an image based on image data of an identical density is formed on the entire page, the reflection characteristic value of the formed image is measured, and statistical values such as a maximum value, average value, standard deviation, and the like are acquired. Whether or not the heterogeneity in page image falls within a permissible range is determined using the statistical values of the measured data, i.e., the values such as the maximum value, average value, standard deviation, and the like.

However, when one observes the homogeneity in page image with his or her own eye, the permissible level associated with color reproduction with respect to an identical color signal changes depending on the distance from an interest point. That is, there are visual perception characteristics in that one easily senses a color difference if the distance from the interest point is short, but one hardly senses the color difference with increasing distance. Since the above evaluation method of homogeneity in page image does not consider such human visual perception characteristics, the correlation between the actually finished image and the evaluation result cannot be exploited fully.

SUMMARY OF THE INVENTION

The first aspect of the present invention discloses a method of evaluating an image quality of printed matter of an image forming apparatus, the method comprising the steps of: outputting image data which forms an image with an arbitrary identical density within a range to be evaluated in one page to an image forming apparatus; inputting data of reflection characteristics of the image at a plurality of measurement points on an image surface of the printed matter output by the image forming apparatus based on the image data; setting one of the plurality of measurement points as a reference point, and calculating distances between the reference point and the remaining measurement points, and reflection characteristic difference between the reference point and the remaining measurement points; and evaluating the image quality within the range to be evaluated based on the distances and the reflection characteristic differences.

According to the present invention, the homogeneity in page image can be evaluated in consideration of the human visual perception characteristics.

Further features of the present invention will become apparent from the following description of exemplary embodiments with reference to the attached drawings.

DESCRIPTION OF THE EMBODIMENTS

The homogeneity in page image evaluation processing according to the present invention will be described in detail hereinafter with reference to the accompanying drawings.

First Embodiment

Arrangement

Figure 1:
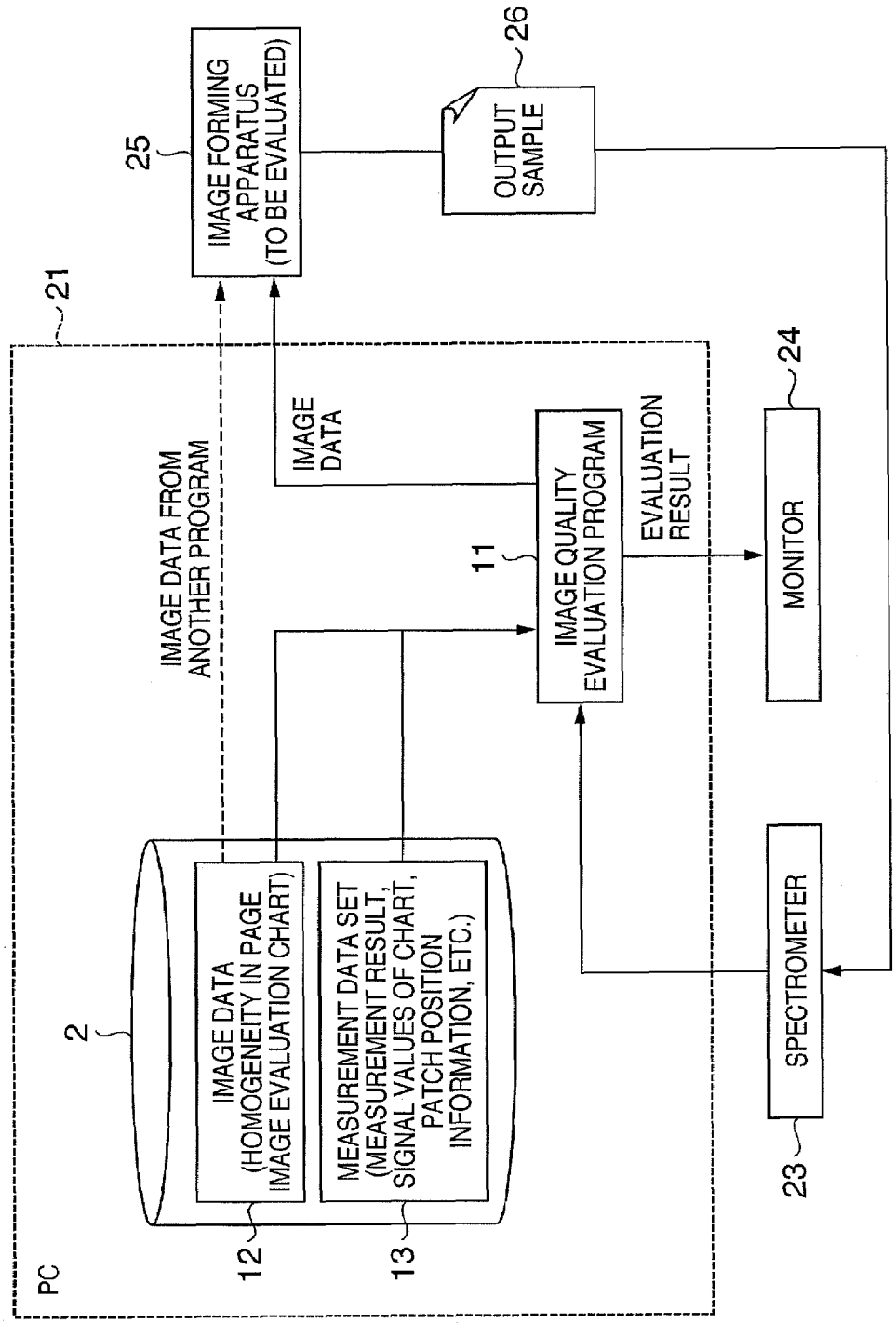
FIG. 1 is a block diagram showing the arrangement a homogeneity in page image evaluation system.

FIG. 1 is a block diagram showing the arrangement of a homogeneity in page image evaluation system of this embodiment.

An image quality evaluation program 11 installed in a personal computer (PC) 21 can read out evaluation data stored in storage media such as a hard disk drive (HDD) 22, and the like. The evaluation data include image data 12 as an evaluation chart, a measurement data set 13, and the like.

The measurement data set 13 includes spectral reflectance characteristics (absolute chromaticity and density) in a target and an image forming apparatus to be evaluated, device color information as signal values of a chart, patch position information, and the like as many as the number of patches.

In order to input the spectral reflectance characteristics of the evaluation chart, a spectrometer 23 is connected to an interface of the PC 21. The spectrometer 23 is desirably of an automatic scan type since the number of patches is large, but the present invention is not limited to such specific type. In order to display the evaluation result of the image quality evaluation program 11, a monitor 24 is connected to the interface of the PC 21. Furthermore, in order to form an image (output sample 26) based on evaluation image data, an image forming apparatus 25 to be evaluated is connected to the interface of the PC 21.

Note that measurement using the spectrometer is desirable but a color meter which can calculate the absolute chromaticity recommended by the CIE (Commission Internationale de l'Eclairage) may be used.

[Processing]

Figure 2:
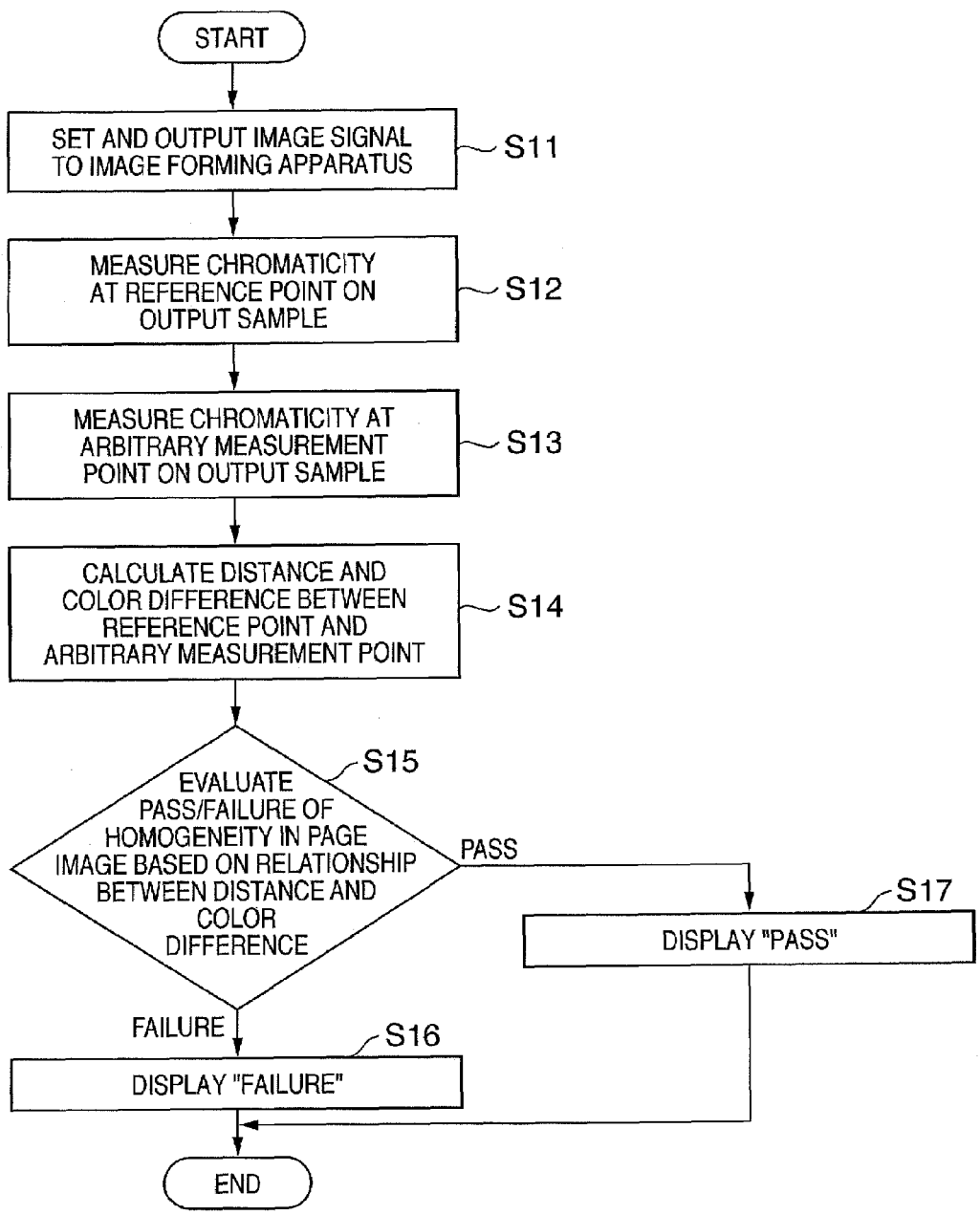
FIG. 2 is a flowchart for explaining the homogeneity in page image evaluation processing by an image quality evaluation program.

FIG. 2 is a flowchart for explaining the homogeneity in page image evaluation processing by the image quality evaluation program 11.

Note that the following description assumes an electrophotographic printer with which the homogeneity in page image is easy to explain. However, the homogeneity in page image evaluation processing to be described below is effective for image forming apparatuses of other systems (silver halide photo, offset printing, ink-jet, sublimation, and the like), and also a monochrome printer.

The image quality evaluation program 11 outputs an image signal which has a signal level corresponding to an interest color and is required to form an image (solid image) with a uniform density in one page (the entire page in this embodiment) to the image forming apparatus 25 which prints an output sample 26 (S11). Note that the image quality evaluation program 11 has a configuration that can issue a print instruction of the output sample 26. Alternatively, the user may open image data using another image edit application which runs on the PC 21, and may issue a print instruction. Normally, the program 11 makes evaluation using an image of gray formed by three colors, i.e., cyan, magenta, and yellow (about 30% each in tone values) or gray formed by four colors additionally using black. When the image forming apparatus 25 comprises independent stations for respective colors, the program 11 makes evaluation by forming monochrome images of cyan, magenta, yellow, and black, i.e., by separating the stations. In this case, assume that mixed-color gray is defined by cyan, magenta, and yellow respectively having tone values=30%, and the program 11 outputs image data which uniformly forms that gray on the entire page having an A4-size to the image forming apparatus 25 as a full-color electrophotographic printer.

The program 11 sets a reference point in the A4-size output sample 26, and measures chromaticity value at the reference point using the spectrometer 23 (S12). As the reference point, a position where a photo image tends to be pasted in terms of layout or a position where the viewer tends to be sensitive about colors is preferably designated. However, when a position is not particularly designated, a position near the center of the page of the output sample 26 is designated. Note that the program measures chromaticity on an L*a*b* coordinate space and outputs Lab values. However, other color coordinate spaces may be used as long as appropriate color differences are obtained.

Next, the program 11 sets an arbitrary measurement point in the output sample 26, and measures a chromaticity value as in step S12 (S13). In the following description, assume that a position about 5 cm away from the reference point is set as the arbitrary measurement point.

The program 11 then calculates the distance and color difference between the reference point and the arbitrary measurement point (S14). A distance $\lambda$ between two points may be obtained by actually measuring that between the two points on the output sample 26 or may be converted from the coordinates of the two points measured by the spectrometer 23. As the color difference, a popularly used index "$\Delta E$" is used. The CIE 1976 color difference $\Delta E$ is defined by:

$$\Delta E = \sqrt{\{(L1-L2)^2 + (a1-a2)^2 + (b1-b2)^2\}} \quad (1)$$

Figure 3:
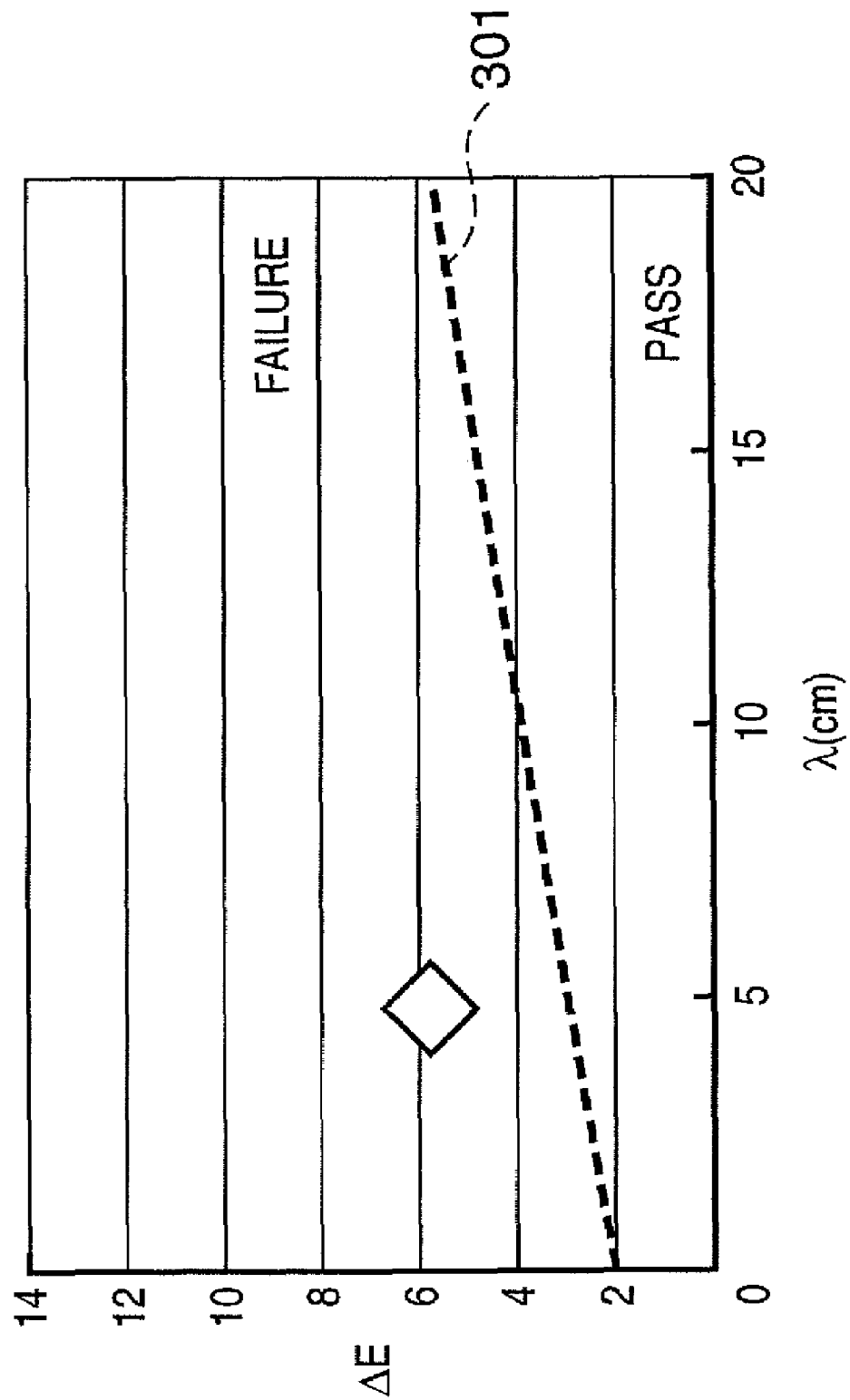
FIG. 3 is a graph for explaining evaluation of the homogeneity in page image.

The program 11 evaluates pass/failure of homogeneity in page image of the output sample 26 based on the relationship between the distance $\lambda$ and the color difference $\Delta E$ (S15). FIG. 3 is a view for explaining the checking processing of the homogeneity in page image. In FIG. 3, the abscissa plots the distance $\lambda$ and the ordinate plots the color difference $\Delta E$. A broken line 301 shown in FIG. 3 is a characteristic curve indicating a pass boundary of homogeneity in page image, which is obtained by subjective evaluation in advance.

The human eye has characteristics depending on the spatial frequency. That is, upon comparing adjacent colors, the human eye can feel a difference between these colors even if that color difference is small. However, the human eye hardly feels a difference between colors at distant positions even if their color difference is large.

In order to recognize the relationship between the distance and color difference in practice, samples are prepared by distributing combinations of colors and distances, and scores indicating whether or not one perceives heterogeneity allowable are acquired from the observation results of the samples by a plurality of persons. Then, the boundary (the curve 301 shown in FIG. 3) between the allowable and unallowable levels of heterogeneity is statistically calculated. As a result, in case of $\lambda \leq 1$ cm, one does not perceive heterogeneity allowable when $\Delta E \geq 2$, and in case of $\Delta E = 15$ cm, one does not perceive heterogeneity allowable when $\Delta E \geq 5$.

The boundary between the allowable and unallowable levels of heterogeneity varies more or less depending on the sample conditions and observation conditions such as what is the selected target color, whether or not moderate gradation is formed between colors at distant positions, whether or not another color is sandwiched between colors if a color chart is used, and so forth. Also, the required level changes depending on the intended purpose of printed matter. Therefore, the boundary 301 cannot be fixed. Therefore, a plurality of boundaries 301 are prepared depending on the target colors, user's required levels, and the like, and are stored in the memory such as the HDD 22 or the like. Then, multi-level evaluation such as pass, almost pass, barely pass, failure, and the like may be made using the plurality of boundaries 301, or the boundaries 301 may be switched. Thus, some measure must be taken.

Since the relationship between the distance and color difference indicated by a rhombic mark in FIG. 3 represents the color difference $\Delta E = 6$ at a distance of 5 cm, the evaluation result of the homogeneity in page image of the output sample 26 is "failure".

If the evaluation result is "failure", the program 11 displays "rejection" indicating "failure" on the monitor 24 (S16). If the evaluation result is "pass", the program displays "success" indicating "pass" on the monitor 24 (S17). Of course, the program 11 displays "pass", "barely pass", "failure", or the like depending on the evaluation levels.

Second Embodiment

The homogeneity in page image evaluation processing according to the second embodiment of the present invention will be described below. Note that the same reference numerals in the second embodiment denote the same parts as in the first embodiment, and a detailed description thereof will be omitted.

Figure 4:
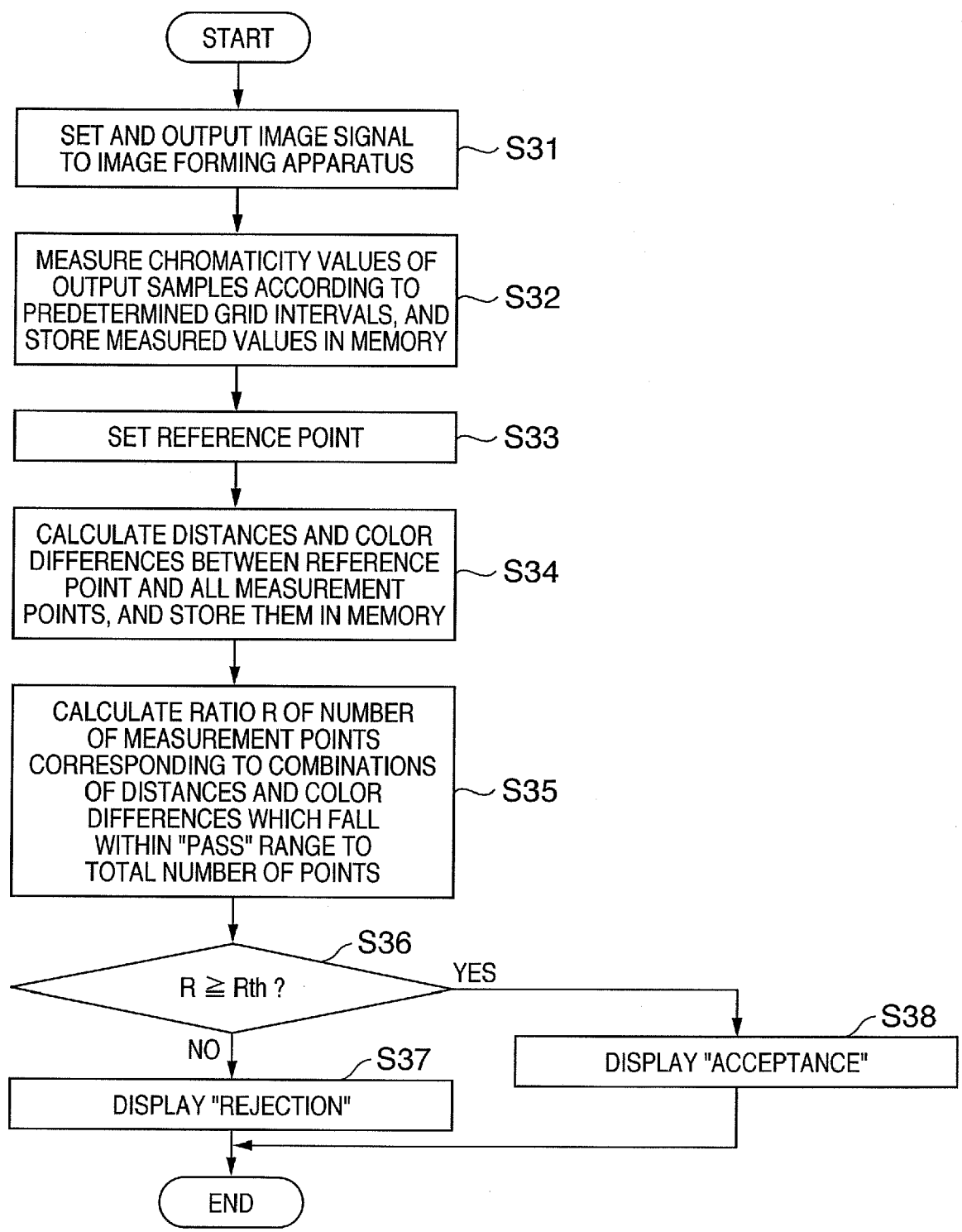
FIG. 4 is a flowchart for explaining the homogeneity in page image evaluation processing by an image quality evaluation program according to the second embodiment.

FIG. 4 is a flowchart for explaining the homogeneity in page image evaluation processing by the image quality evaluation program 11.

As in the first embodiment, the image quality evaluation program 11 outputs an image signal which has a signal level corresponding to an interest color and is required to form an image with a uniform density in the entire page to the image forming apparatus 25 which prints an output sample 26 (S31).

Figure 5:
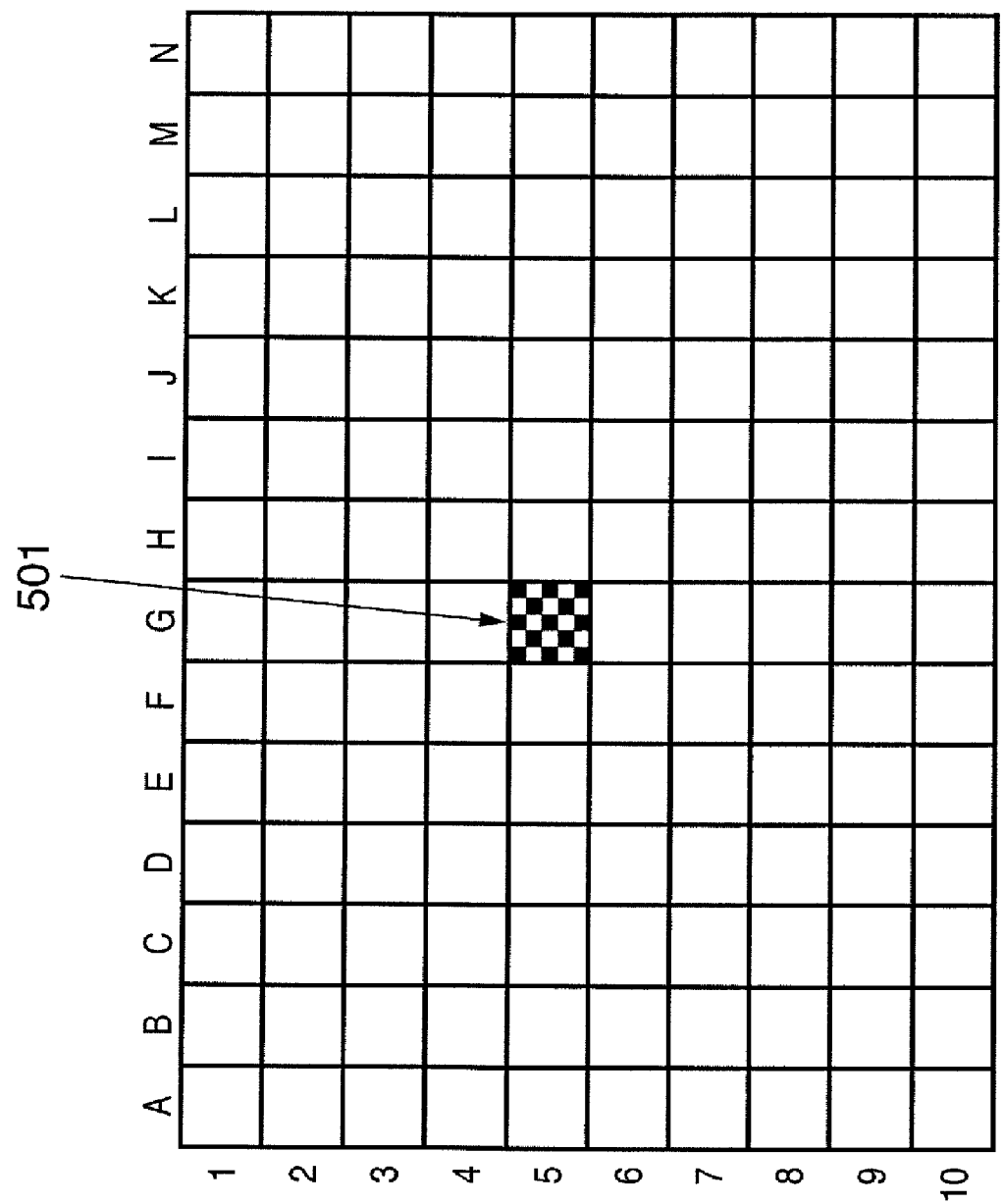
FIG. 5 shows an example of grids.

The program 11 then measures chromaticity values at a plurality of points in page image of the output sample 26 according to predetermined grid intervals, and stores the measured values in the memory such as the HDD 22 or the like (S32). FIG. 5 shows an example of grids. For example, the program 11 sets 10×14 grids in about 2-cm increments for the A4-size output sample 26, and measures a chromaticity value at nearly the center of each grid.

Next, the program 11 sets a reference point (S33). In the following description, assume that the center of a grid 501 shown in FIG. 5 is set as the reference point. Note that an important point may be arbitrarily selected as the reference point as in the first embodiment.

The program 11 calculates distances $\lambda i$ between the reference point and all the measurement points and color differences $\Delta Ei$ between the reference point and all the measurement points, and stores them in association with each other as sets of the distances and color differences in the memory such as the HDD 22 or the like (S34).

Figure 6:
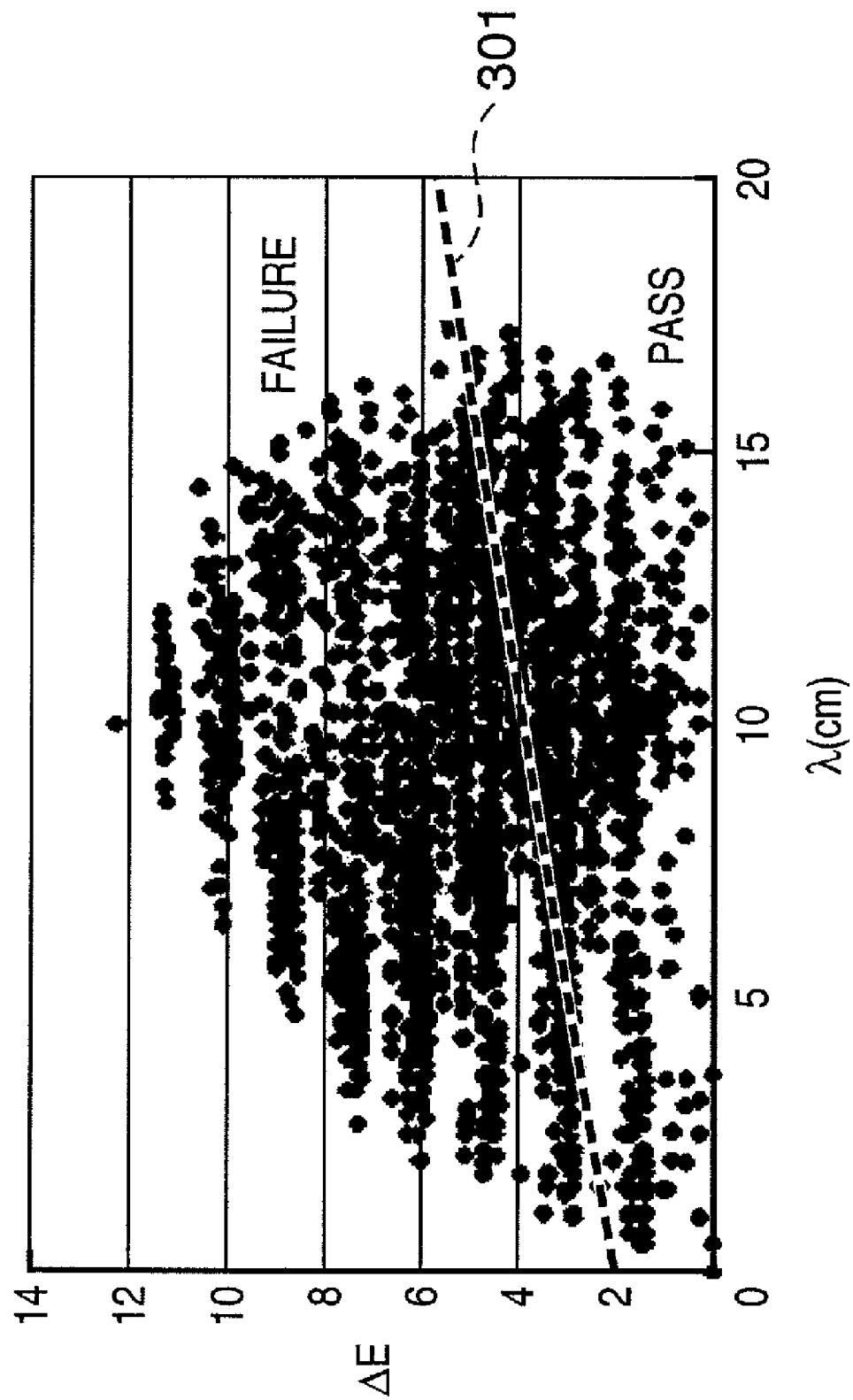
FIG. 6 is a graph showing an example of the relationship between the distances between a reference point and all measurement points, and color differences.

The program 11 then calculates a ratio R of the number of combinations of the distances $\lambda i$ and color differences $\Delta Ei$, which combinations fall within the "pass" range with respect to the boundary 301 described in the first embodiment, to the total number of combinations of the distances $\lambda i$ and color differences $\Delta Ei$ between the reference point and all the measurement points (S35). FIG. 6 shows an example of the relationship of the distances and color differences between the reference point and all the measurement points. In the example shown in FIG. 6, the ratio R of the number of combinations which fall within the "acceptance" range is about 45%.

The program 11 compares the ratio R of the number of combinations which fall within the "acceptance"1 range with a ratio Rth (e.g., 60%) which is set in advance (S36). If R<Rth, the program 11 determines "failure", and displays "rejection" indicating "failure" on the monitor 24 (S37). If R≧Rth, the program 11 determines "pass", and displays "acceptance" indicating "pass" on the monitor 24 (S38). In the example of FIG. 6, since R=45%<60%, the program 11 displays "rejection".

In case of "rejection", the program 11 not only displays a message but also can notify all the users who use the image forming apparatus 25 of the status of that apparatus via a network to which the image forming apparatus 25 is connected. In case of an apparatus which has a contract for a maintenance service like a multi-functional peripheral equipment (MFP), the program 11 may send information indicating the status of that apparatus to a service spot via the Internet. In this way, the evaluation result can be used significantly.

Third Embodiment

The homogeneity in page image evaluation processing according to the third embodiment of the present invention will be described below. Note that the same reference numerals in the third embodiment denote the same parts as in the first and second embodiments, and a detailed description thereof will be omitted.

The evaluation method of the above embodiments functions effectively when the heterogeneity in page image gradually becomes rich or pale in one direction. However, in case of periodic or local heterogeneity, the image quality evaluation program 11 may determine "pass" even for heterogeneity that one may actually find objectionable.

With this in mind, the program 11 shifts the reference point in the second embodiment in turn to grids A1, A2, A3, . . . , A10, B1, B2, . . . , N1, N2, . . . , N10 shown in FIG. 5. The program 11 calculates the distances $\lambda$ and color differences $\Delta E$ between each reference point and all the measurement points, and calculates the ratio R for acceptance evaluation. In this case, if all the points are set as reference points, double counting occurs. Hence, when a calculation algorithm is programmed not to calculate the same combinations twice, the calculation time and the required memory size upon calculation can be reduced.

Fourth Embodiment

The homogeneity in page image evaluation processing according to the fourth embodiment of the present invention will be described below. Note that the same reference numerals in the fourth embodiment denote the same parts as in the first to third embodiments, and a detailed description thereof will be omitted.

In case of an electrophotographic printer, heterogeneous patterns corresponding to given causes like a heterogeneous pattern resulting from the photosensitive drum pitch, that resulting from contamination of a charger, that depending on a developer, and the like can be projected to some extent as the heterogeneous tendency of the homogeneity in page image. Therefore, the homogeneity in page image can be evaluated without the round-robin calculations of the third embodiment.

Figure 7:
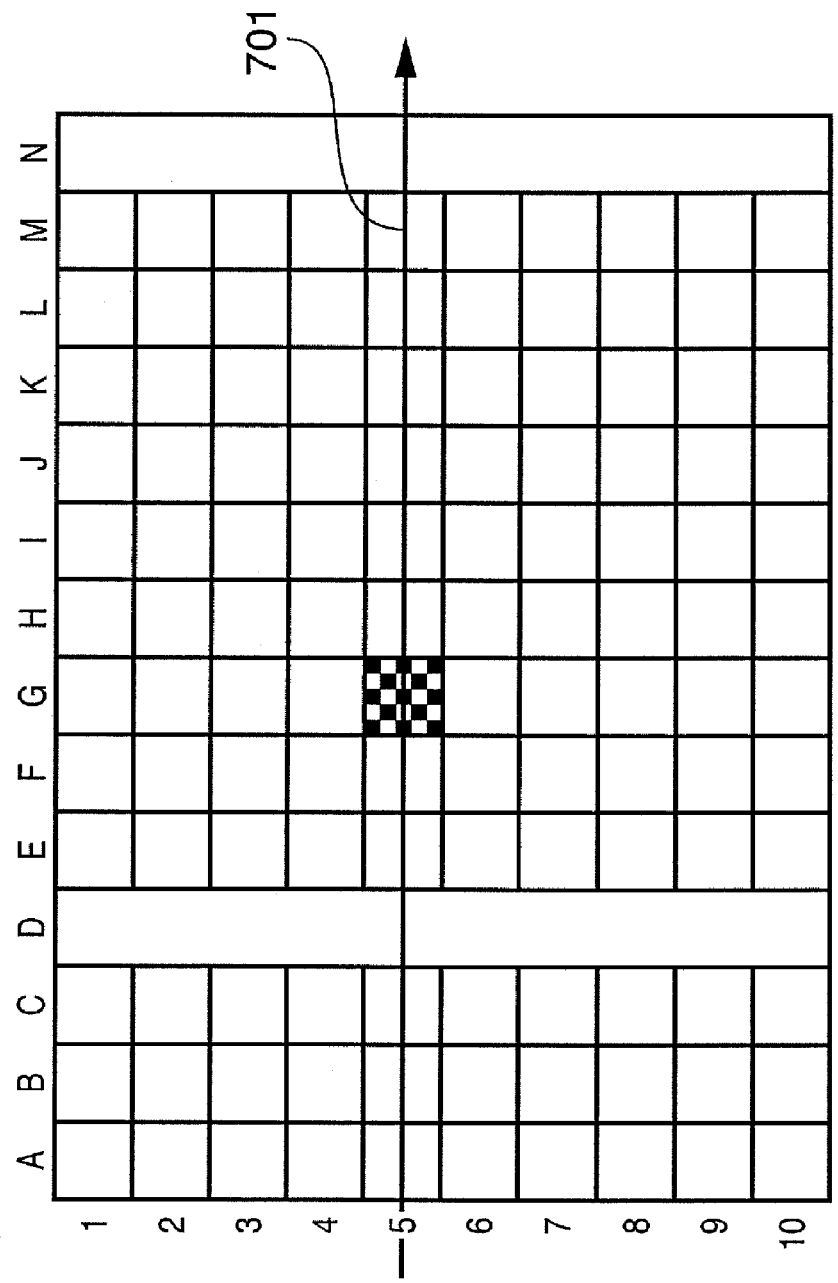
FIG. 7 shows a heterogeneous pattern which may occur in practice.

FIG. 7 shows a realistically possible heterogeneous pattern. When dark heterogeneity due to the drum cycle has occurred in columns D and N, data of a measurement point group in a direction perpendicular to that heterogeneity, i.e., a data sequence indicated by an arrow 701 in FIG. 7 is examined.

Figure 8:
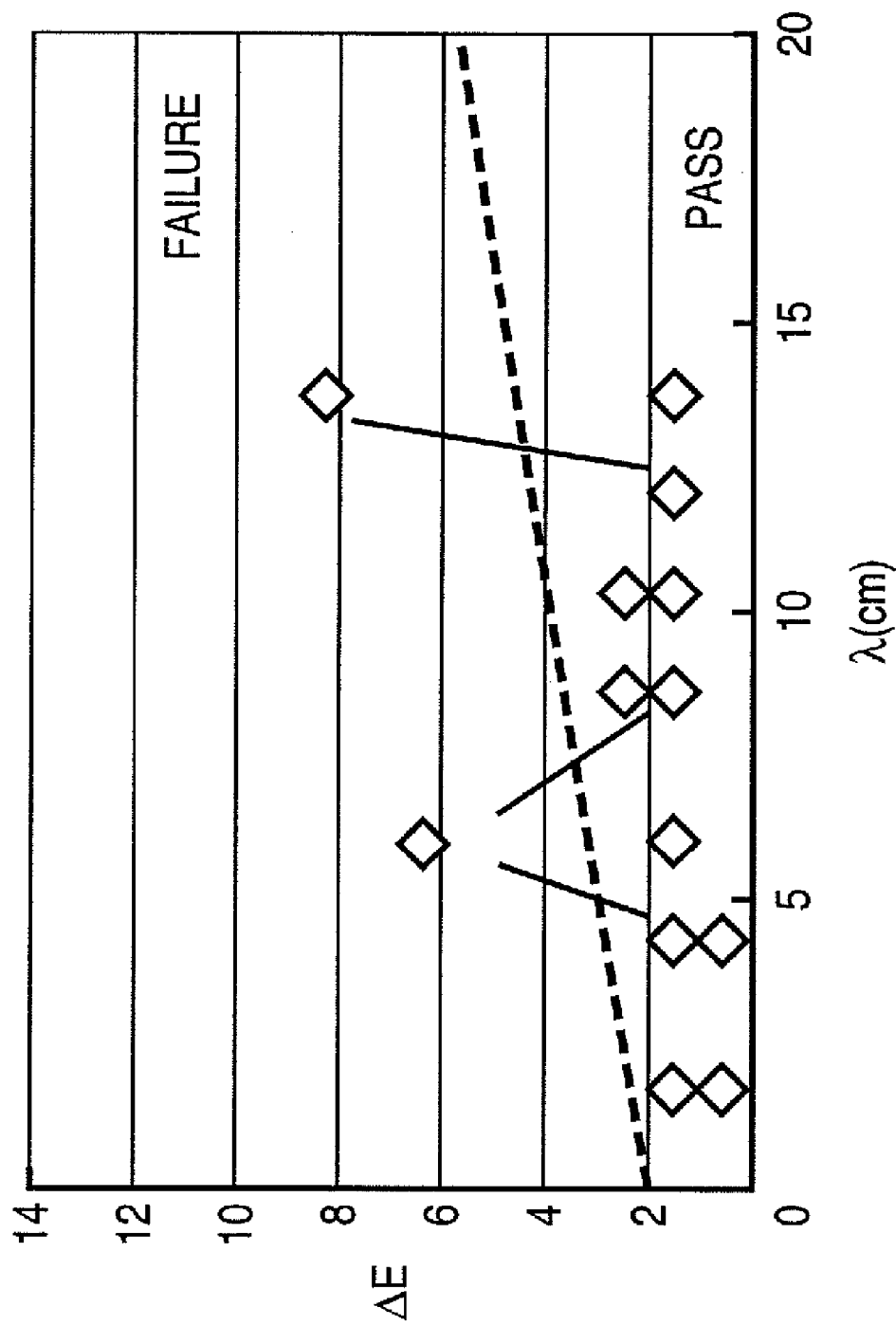
FIG. 8 is a graph showing an example of the relationship between distances $\lambda$ between the reference point in an interest data sequence and all the measurement points, and color differences $\Delta E$.

FIG. 8 shows an example of the distances $\lambda$ and color differences $\Delta E$ between the reference point and all the measurement points in the interest data sequence. Combinations of the distances and color differences corresponding to columns D and N where the dark heterogeneity has occurred are plotted in a "rejection" range. That is, even when most of the measurement results fall within the "acceptance" range, if there is a large gap between the color difference at a given measurement point and that at the neighboring measurement point, it is determined that heterogeneity is visually considerable.

From such characteristics, if a gap between the color differences between contiguous measurement points is large even for data calculated based on one reference point, it suggests the presence of heterogeneity indicating an abrupt change, and a warning message can be displayed on the monitor 24. In case of an apparatus which has a contract for a maintenance service, information indicating such warning message may be sent to the service spot via the Internet, thus urging an adequate measure.

According to the aforementioned embodiments, in order to evaluate the state of printed matter of the image forming apparatus, arbitrary, identical image data is output to form a solid image on the entire page, and the reflection characteristics at predetermined points on the image surface of the printed matter are measured, thus evaluating the image quality based on the measured data. In this case, the homogeneity in page image of the printed matter is evaluated by checking pass or failure of homogeneity in page image (the presence/absence of color heterogeneity) using an evaluation curve in consideration of the visual perception characteristics to have the combinations of the differences between the reflection characteristics at a reference point and arbitrary measurement points and the distances between these points as an evaluation index. In other words, the homogeneity in page image is evaluated based on the reflection characteristic differences weighed by the distances. Therefore, a problem about unsuccessful explanation of the correlation between an actually finished image and the evaluation result can be solved.

The reflection characteristics used in evaluation can use the spectral reflectance, optical density, chromaticity, glossiness, and the like. The multi-level evaluation using a plurality of boundaries described in the first embodiment may be applied to the second to fourth embodiments, and a display corresponding to an evaluation level can be made.

In the aforementioned embodiments, the image data, which uniformly forms that gray with predetermined density on the entire page having an A4-size, is outputted to the image forming apparatus. Also image data which uniformly form an image on a range to be evaluated in one page can be outputted.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-376672, filed Dec. 27, 2005, which is hereby incorporated by reference herein in its entirety.

What is claimed is:

1. A method of evaluating an image quality of printed matter of an image forming apparatus, the method comprising the steps of:

outputting image data which forms an image with an arbitrary identical density within a range to be evaluated in one page to an image forming apparatus;

inputting data of reflection characteristics of the image at a plurality of measurement points on an image surface of the printed matter output by the image forming apparatus based on the image data;

setting one of the plurality of measurement points as a reference point, and calculating distances between the reference point and the remaining measurement points, and reflection characteristic difference between the reference point and the remaining measurement points; and evaluating the image quality within the range to be evaluated based on the distances and the reflection characteristic differences.

2. The method according to claim 1, wherein the evaluating step includes a step of evaluating the image quality based on combinations of the distances and the reflection characteristic differences and a characteristic curve indicating an acceptance boundary of homogeneity in page image which is obtained by preliminary subjective evaluation.

3. The method according to claim 2, wherein the evaluating step includes a step of making multi-level evaluation of the image quality using a plurality of characteristic curves each indicating the acceptance boundary.

4. The method according to claim 1, wherein the evaluating step includes a step of calculating, based on combinations of the distances and the reflection characteristic differences and a characteristic curve indicating an acceptance boundary of homogeneity in page image which is obtained by preliminary subjective evaluation, a ratio of the combinations falling within an acceptance range of the homogeneity in page image, and evaluating the image quality by comparing the ratio and a predetermined threshold.

5. The method according to claim 4, further comprising the step of generating a warning when at least one of the combinations of the distances and the reflection characteristic differences falls within a rejection range of the homogeneity in page image with respect to the plurality of measurement points along a straight line including the reference point on the printed matter.

6. An evaluation apparatus for evaluating an image quality of printed matter of an image forming apparatus, comprising:

an output section, arranged to output image data which forms an image with an arbitrary identical density within a range to be evaluated in one page to an image forming apparatus;

an input section, arranged to input data of reflection characteristics of the image at a plurality of measurement points on an image surface of the printed matter output by the image forming apparatus based on the image data;

a calculator, arranged to set one of the plurality of measurement points as a reference point, and to calculate distances between the reference point and the remaining measurement points, and reflection characteristic differences between the reference point and the remaining measurement points; and an evaluator, arranged to evaluate the image quality within the range to be evaluated based on the distances and the reflection characteristic differences.

7. A computer readable product storing a computer program enabling a computer to perform a method of evaluating an image quality of printed matter of an image forming apparatus, the method comprising the steps of:

outputting image data which forms an image with an arbitrary identical density within a range to be evaluated in one page to an image forming apparatus;

inputting data of reflection characteristics of the image at a plurality of measurement points on an image surface of the printed matter output by the image forming apparatus based on the image data;

setting one of the plurality of measurement points as a reference point, and calculating distances between the reference point and the remaining measurement points, and reflection characteristic differences between the reference point and the remaining measurement points; and evaluating the image quality within the range to be evaluated based on the distances and the reflection characteristic differences.

* * * * *